United States Patent
Niesen et al.

(10) Patent No.: US 11,474,235 B2
(45) Date of Patent: Oct. 18, 2022

(54) SYSTEM AND METHOD TO USE REFLECTED DOPPLER RADAR SIGNALS TO LOCATE A SECOND MOBILE DEVICE

(71) Applicant: QUALCOMM Incorporated, San Diego, CA (US)

(72) Inventors: Urs Niesen, Berkeley Heights, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 798 days.

(21) Appl. No.: 16/267,637

(22) Filed: Feb. 5, 2019

(65) Prior Publication Data

US 2019/0369233 A1  Dec. 5, 2019

Related U.S. Application Data

(60) Provisional application No. 62/677,458, filed on May 29, 2018.

(51) Int. Cl.
*G01S 13/931* (2020.01)
*H04W 4/44* (2018.01)
(Continued)

(52) U.S. Cl.
CPC ........... *G01S 13/872* (2013.01); *G01S 13/46* (2013.01); *G01S 13/5244* (2013.01);
(Continued)

(58) Field of Classification Search
CPC ...... G01S 13/931; G01S 13/462; G01S 13/46; G01S 7/023; G01S 13/5244;
(Continued)

(56) References Cited

U.S. PATENT DOCUMENTS

2010/0246506 A1* 9/2010 Krishnaswamy .......................... H04W 72/0453
370/329
2012/0120883 A1* 5/2012 Chen .................. H04W 74/08
370/329
(Continued)

FOREIGN PATENT DOCUMENTS

JP  5146674 B2  2/2013

OTHER PUBLICATIONS

International Search Report and Written Opinion—PCT/US2019/029162—ISA/EPO—dated Sep. 6, 2019.

*Primary Examiner* — Donald H B Braswell
(74) *Attorney, Agent, or Firm* — Danai Nelisile Mhembere; Holland & Hart LLP

(57) ABSTRACT

Techniques are described herein for allowing one or more vehicles or radar systems in an environment to passively detect radar signals from other vehicles or other radar systems and determine spatial parameters of objects based on the passively received radar signals. A primary vehicle (or user equipment (UE) associated with the primary vehicle) may be configured to receive one or more radar signals from one or more secondary vehicles (or UEs associated with the secondary vehicles). The primary vehicle may be configured to determine one or more spatial parameters of the secondary vehicle based on the passively received radar signals. In some cases, the primary vehicle may receive an indication that identifies at least some communication resources to be used by the secondary vehicle to transmit the radar signals. The primary vehicle may determine one or more driving operations based on determining the spatial parameter.

28 Claims, 11 Drawing Sheets

(51) Int. Cl.
*H04W 4/46* (2018.01)
*H04W 84/12* (2009.01)
*G01S 13/46* (2006.01)
*G01S 13/87* (2006.01)
*G01S 13/524* (2006.01)

(52) U.S. Cl.
CPC ............. *G01S 13/931* (2013.01); *H04W 4/44* (2018.02); *H04W 4/46* (2018.02); *H04W 84/12* (2013.01); *G01S 2013/9316* (2020.01)

(58) Field of Classification Search
CPC . G01S 2013/9316; H04W 84/12; H04W 4/46; H04W 4/44
See application file for complete search history.

(56) References Cited

U.S. PATENT DOCUMENTS

| | | | |
|---|---|---|---|
| 2014/0022108 A1 | 1/2014 | Alberth, Jr. et al. | |
| 2017/0111122 A1* | 4/2017 | Shimizu | H04L 67/16 |
| 2017/0293027 A1 | 10/2017 | Stark et al. | |
| 2018/0120861 A1 | 5/2018 | Saxena et al. | |
| 2018/0183650 A1* | 6/2018 | Zhang | G01S 13/003 |
| 2018/0294935 A1* | 10/2018 | Uchiyama | H04W 4/40 |
| 2019/0238658 A1* | 8/2019 | Shimizu | H04L 67/327 |

* cited by examiner

SYSTEM AND METHOD TO USE REFLECTED DOPPLER RADAR SIGNALS TO LOCATE A SECOND MOBILE DEVICE

CROSS REFERENCE

The present Applications for Patent claims the benefit of U.S. Provisional Patent Application No. 62/677,458 by Niesen, et al., entitled "SIGNALING FOR RADAR SYSTEMS," filed May 29, 2018, assigned to the assignee hereof, and expressly incorporated by reference in its entirety herein.

BACKGROUND

The following relates generally to wireless communications, and more specifically to signaling for radar systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communication environments may include multiple radar systems being deployed in a relatively small area. For example, different vehicles may use radar systems or lidar systems on a road. As the number of radar systems used in a given area increases, the potential for interference between radar systems also increases.

SUMMARY

The described techniques relate to improved methods, systems, devices, and apparatuses that support signaling for wireless communication systems, such as radar systems. Generally, the described techniques relate to allowing one or more vehicles, or user equipments (UEs) or radar systems in an environment to passively detect radar signals from other vehicles or other radar systems, and determine spatial parameters of objects based on the passively received radar signals. A primary vehicle or a UE associated with the primary vehicle) may be configured to receive one or more radar signals from one or more other objects, such as secondary vehicles (or UEs associated with the secondary vehicles) or potential obstacles. The primary vehicle may be configured to determine one or more spatial parameters (e.g., velocity, range, location, and/or angle) of one or more secondary vehicles based on the passively received radar signals. In some cases, the primary vehicle may receive an indication that identifies at least some communication resources (e.g., to be used by, previously used by) for communicating with the secondary vehicle to transmit the radar signals. The primary vehicle may determine one or more driving operations based on determining one or more spatial parameters.

A method of wireless communication is described. The method may include receiving, by a first UE associated with a first vehicle, an indication of a resource use pattern of a radar signal transmitted by a second UE associated with a second vehicle, configuring a receiver of the first UE based on receiving the indication of the resource use pattern, receiving a radar signal transmitted by the second UE based on configuring the receiver, and determining a spatial parameter about the second UE based on receiving the radar signal transmitted by the second UE.

An apparatus for wireless communication is described. The apparatus may include a processor, memory in electronic communication with the processor. The processor and the memory may be configured to cause the apparatus to receive, by a first UE associated with a first vehicle, an indication of a resource use pattern of a radar signal transmitted by a second UE associated with a second vehicle, configure a receiver of the first UE based on receiving the indication of the resource use pattern, receive a radar signal transmitted by the second UE based on configuring the receiver, and determine a spatial parameter about the second UE based on receiving the radar signal transmitted by the second UE.

Another apparatus for wireless communication is described. The apparatus may include means for receiving, by a first UE associated with a first vehicle, an indication of a resource use pattern of a radar signal transmitted by a second UE associated with a second vehicle, configuring a receiver of the first UE based on receiving the indication of the resource use pattern, receiving a radar signal transmitted by the second UE based on configuring the receiver, and determining a spatial parameter about the second UE based on receiving the radar signal transmitted by the second UE.

A non-transitory computer-readable medium storing code for wireless communication is described. The code may include instructions executable by a processor to receive, by a first UE associated with a first vehicle, an indication of a resource use pattern of a radar signal transmitted by a second UE associated with a second vehicle, configure a receiver of the first UE based on receiving the indication of the resource use pattern, receive a radar signal transmitted by the second UE based on configuring the receiver, and determine a spatial parameter about the second UE based on receiving the radar signal transmitted by the second UE.

Some examples of the method, apparatuses, and non-transitory computer-readable medium described herein may further include operations, features, means, or instructions for receiving, by the first UE, a second indication of a second resource use pattern of a second radar signal transmitted by a third UE associated with a third vehicle and configuring the receiver to filter out the second radar signal transmitted by the third UE based on receiving the radar signal transmitted by the second UE may be based on filtering the radar signals transmitted by the third UE.

Some examples of the method, apparatuses, and non-transitory computer-readable medium described herein may further include operations, features, means, or instructions for determining a second spatial parameter for the first UE and filtering the radar signal using the second spatial parameter, where determining the spatial parameter for the second UE may be based on filtering the radar signal using the second spatial parameter.

Some examples of the method, apparatuses, and non-transitory computer-readable medium described herein may further include operations, features, means, or instructions for receiving sync information and determining a transmit parameter of the radar signal based on receiving the sync information, where determining the spatial parameter about the second UE may be based on determining the transmit parameter of the radar signal.

Some examples of the method, apparatuses, and non-transitory computer-readable medium described herein may further include operations, features, means, or instructions for transmitting feedback to the second UE based on determining the spatial parameter of the second UE.

In some examples of the method, apparatuses, and non-transitory computer-readable medium described herein, receiving the indication may include operations, features, means, or instructions for receiving a second radar signal that includes the indication, the second radar signal being encoded with information about the resource use pattern of radar signals transmitted by the second UE.

In some examples of the method, apparatuses, and non-transitory computer-readable medium described herein, the second radar signal includes radar timing information, the indication of the resource use pattern, and information associated with the resource use pattern.

In some examples of the method, apparatuses, and non-transitory computer-readable medium described herein, receiving the indication may include operations, features, means, or instructions for receiving a signal that includes the indication, the signal being communicated using a different radio frequency spectrum band than the radar signal.

In some examples of the method, apparatuses, and non-transitory computer-readable medium described herein, the signal may be modulated using a Wi-Fi radio access technology (RAT), a Bluetooth RAT, a 3G RAT, a 4G RAT, a 5G RAT, a Zigbee RAT, a dedicated short range communications (DSRC) RAT, a vehicle-to-everything (V2X) RAT, or a combination thereof.

In some examples of the method, apparatuses, and non-transitory computer-readable medium described herein, the radar signal received from the second UE may have been reflected off of a stationary obstacle, where determining the spatial parameter about the second UE may be based on the radar signal being reflected off of the stationary obstacle.

Some examples of the method, apparatuses, and non-transitory computer-readable medium described herein may further include operations, features, means, or instructions for identifying a location of the stationary obstacle, where determining the spatial parameter about the second UE may be based on identifying the location of the stationary obstacle.

In some examples of the method, apparatuses, and non-transitory computer-readable medium described herein, identifying the location of the stationary obstacle may include operations, features, means, or instructions for accessing map data to determine the location of the stationary obstacle relative to the first UE.

In some examples of the method, apparatuses, and non-transitory computer-readable medium described herein, identifying the location of the stationary obstacle may include operations, features, means, or instructions for transmitting, by the first UE, a second radar signal and receiving, by the first UE, a third radar signal reflected off of the stationary obstacle based on transmitting the second radar signal, where identifying the location of the stationary obstacle may be based on receiving the third radar signal.

Some examples of the method, apparatuses, and non-transitory computer-readable medium described herein may further include operations, features, means, or instructions for identifying a Doppler shift of the radar signal reflected off of the stationary obstacle and filtering components of the Doppler shift of the radar signal contributed by movement of the first UE, where determining the spatial parameter about the second UE may be based on filtering the components of the Doppler shift of the radar signal contributed by the movement of the first UE.

Some examples of the method, apparatuses, and non-transitory computer-readable medium described herein may further include operations, features, means, or instructions for receiving a second radar signal transmitted by the second UE, the second radar signal being reflected off of an obstacle and determining a transmit parameter of the radar signal based on receiving the radar signal and the second radar signal transmitted by the second UE, where determining the spatial parameter about the second UE may be based on determining the transmit parameter of the radar signal.

Some examples of the method, apparatuses, and non-transitory computer-readable medium described herein may further include operations, features, means, or instructions for operating a vehicle associated with the first UE based on determining the spatial parameter of the second UE.

Some examples of the method, apparatuses, and non-transitory computer-readable medium described herein may further include operations, features, means, or instructions for storing information related to a set of radar signals received from the second UE over time and filtering the stored information by rejecting outliers in the information, where determining the spatial parameter about the second UE may be based on filtering the stored information.

Some examples of the method, apparatuses, and non-transitory computer-readable medium described herein may further include operations, features, means, or instructions for determining a characteristic of the radar signal based on receiving the radar signal, where determining the spatial parameter may be based on determining the characteristic.

In some examples of the method, apparatuses, and non-transitory computer-readable medium described herein, the characteristic includes a time of flight of the radar signal, a Doppler shift of the radar signal, or an angle of arrival of the radar signal, or a combination thereof.

In some examples of the method, apparatuses, and non-transitory computer-readable medium described herein, the spatial parameter of the second UE includes a location of the second UE, a speed of the second UE, a direction of travel of the second UE, a velocity of the second UE, or a combination thereof.

In some examples of the method, apparatuses, and non-transitory computer-readable medium described herein, the resource use pattern includes information regarding frequency resources for use by the second UE to transmit the radar signal, time resources for use by the second UE to transmit the radar signal, a direction of transmission of the radar signal transmitted by the second UE, or a combination thereof.

In some examples of the method, apparatuses, and non-transitory computer-readable medium described herein, the radar signal received from the second UE may be an unreflected radar signal received directly from the second UE.

In some examples of the method, apparatuses, and non-transitory computer-readable medium described herein, a resource use pattern for transmitting a radar signal may be unique to each UE in a network.

DETAILED DESCRIPTION

Some vehicles may include one or more radar systems configured to determine the information related to objects in the environment surrounding the vehicle. The radar systems may include a transmitter that transmits the radar signal and a receiver or sensor that receives a reflected radar signal. The vehicle may be configured to determine one or more spatial parameters (e.g., velocity, range, location, and/or angle) of one or more objects in the environment based on the radar signals that are reflected back to the vehicle. As the number of radar systems in an environment increases, so too will the interference between radar systems.

Techniques are described herein for allowing one or more vehicles or radar systems in an environment to passively detect radar signals from other vehicles or other radar systems, and determine spatial parameters of objects based on the passively received radar signals. A primary vehicle (or user equipment (UE) associated with the primary vehicle) may be configured to receive one or more radar signals from one or more secondary vehicles (or UEs associated with the secondary vehicles). The primary vehicle may be configured to determine one or more spatial parameters (e.g., velocity, range, location, and/or angle) of the secondary vehicle based on the passively received radar signals. In some cases, the primary vehicle may receive an indication that identifies at least some communication resources to be used by the secondary vehicle to transmit the radar signals. The primary vehicle may determine one or more driving operations based on determining the spatial parameter.

Aspects of the disclosure are initially described in the context of a wireless communications system. Aspects of the disclosure are illustrated by and described with reference to environments, systems, and process flows related to radar systems. Aspects of the disclosure are further illustrated by and described with reference to apparatus diagrams, system diagrams, and flowcharts that relate to signaling for radar systems. Although some sections are described with reference to a vehicle and related communications, the present disclosure is not limited to this application and should be understood to be generally applicable in various, diverse applications.

Figure 1:
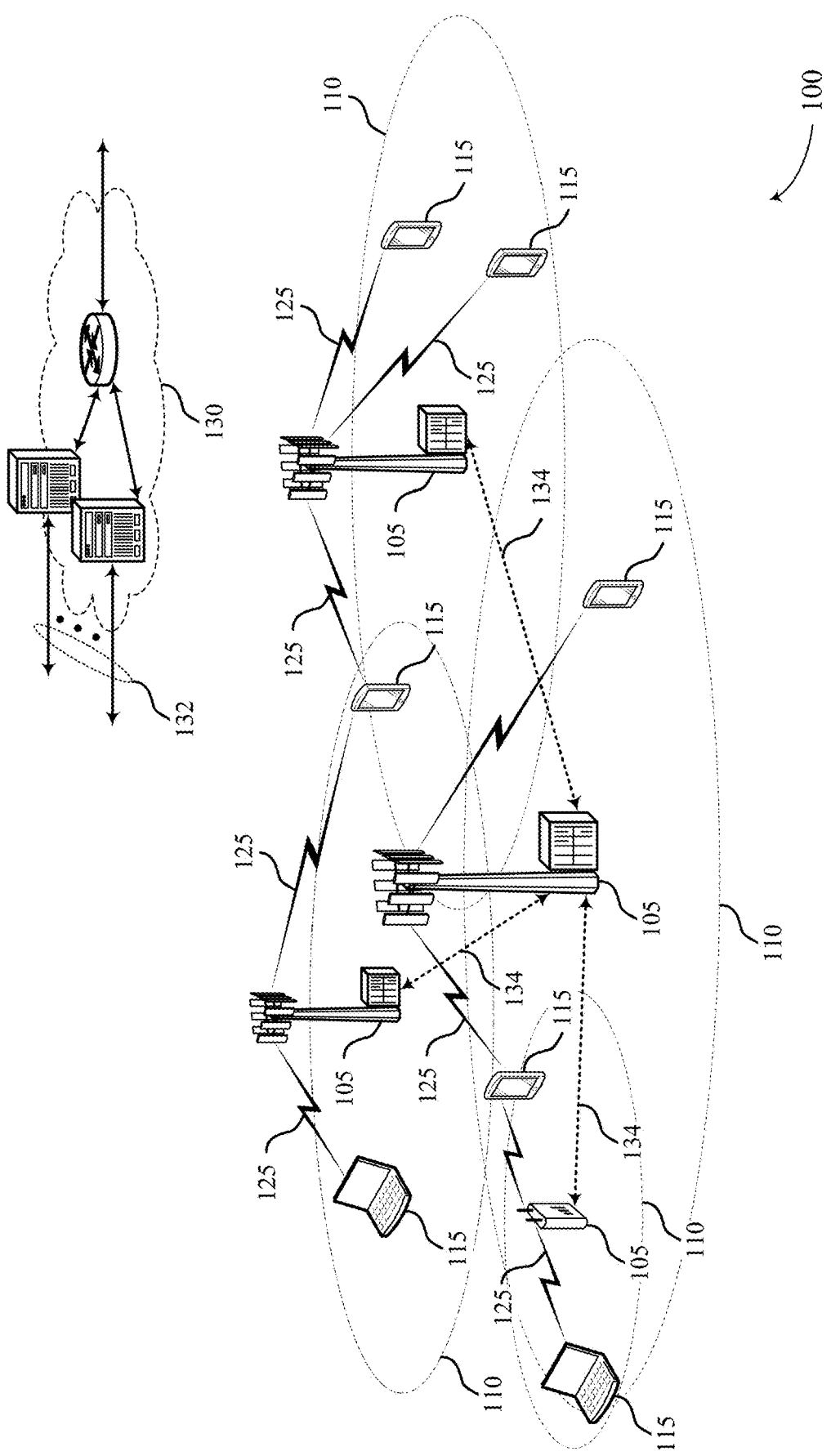
FIG. 1 illustrates an example of a system for wireless communications that supports signaling for radar systems in accordance with aspects of the present disclosure.

FIG. 1 illustrates an example of a wireless communications system 100 that supports signaling for radar systems in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like. In some cases, the UEs 115 may also be able to use radar systems to determine spatial parameters using radar signals and/or communicate information using radar signals.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of an NR/5G and/or mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform-spread-OFDM (DFT-S-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In some examples, vehicles may include one or more UEs 115 configured to communicate using radar signals and/or other types of wireless communication signals. A UE 115 of a primary vehicle, as one example, may be configured to use radar signals transmitted by a UE 115 of a secondary vehicle to determine one or more spatial parameters of the secondary vehicle and/or one or more obstacles or other objects. These other radar signals may be used instead of the primary vehicle using its own radar signals (e.g., instead of using an active radar signal). To facilitate using the radar signals communicated by other UEs 115, the resource use patterns associated with radar signals of the other UEs 115 may be communicated to UE 115 of the primary vehicle. The UE 115 of the primary vehicle may use the resource use patterns to target certain radar signals for detection (among other operations) and determine spatial parameters for a specific vehicle based on the targeted radar signals.

Figure 2:
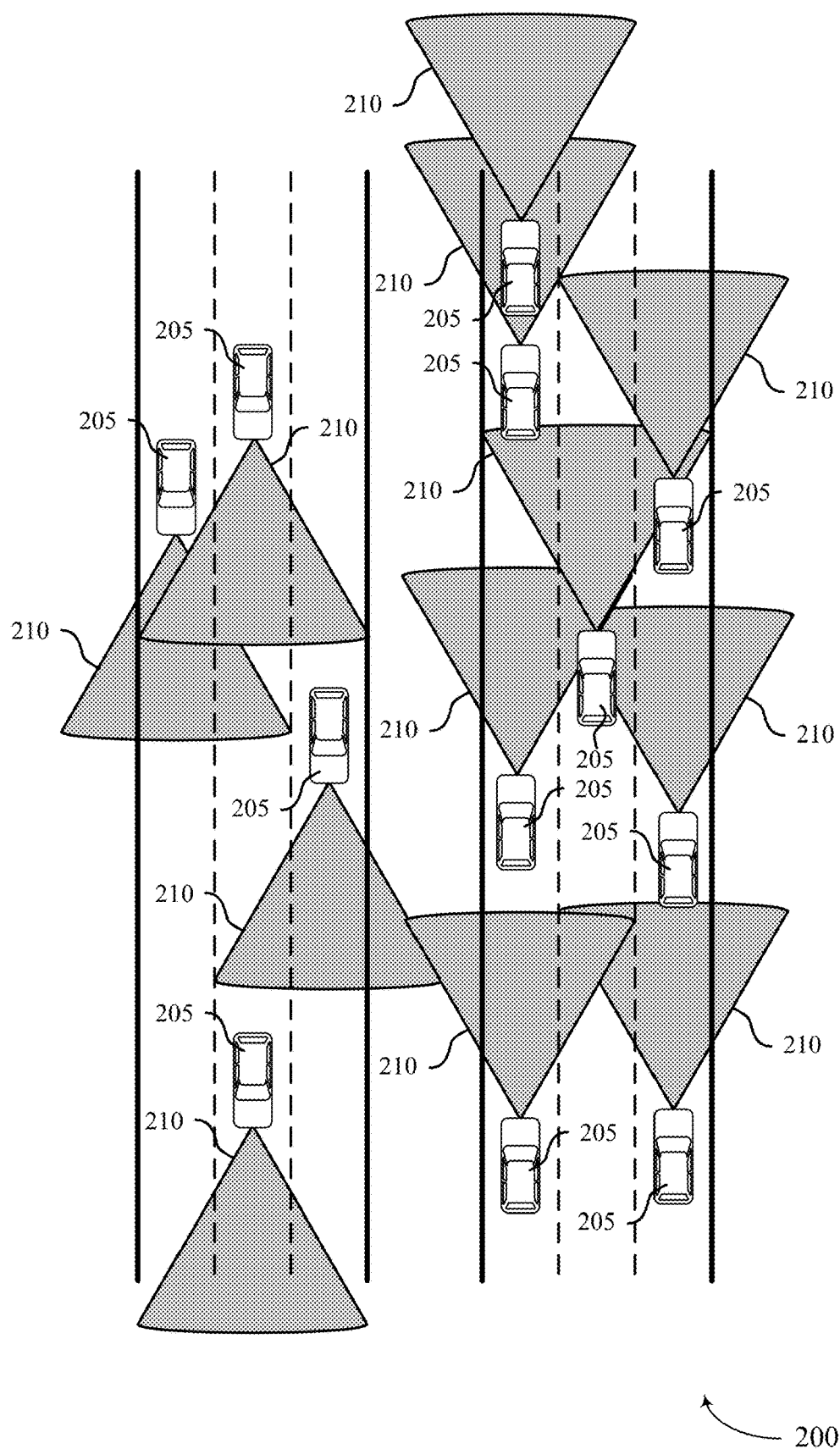
FIG. 2 illustrates an example of an environment for using radar systems that supports signaling for radar systems in accordance with aspects of the present disclosure.

FIG. 2 illustrates an example of an environment 200 for using radar systems that supports signaling for radar systems in accordance with aspects of the present disclosure. In some examples, the environment 200 may implement aspects of the wireless communications system 100. The environment 200 for using radar may be a ground-based vehicle environment such as a road system. The environment 200 may include a plurality of vehicles 205, where at least some of the vehicles may be configured with a radar system.

Some vehicles 205 may incorporate advanced driver-assistance systems or self-driving systems. Such systems may include lane-assist systems, automatic braking systems, adaptive cruise control systems, and/or may include features of self-driving vehicles. Vehicles 205 that include advanced driver-assistance systems may include one or more radar systems. For example, a vehicle 205 may include a forward-facing radar system to detect objects in the direction of travel of the vehicle 205. Such a system may be useful to avoid collisions with the detected objects. In some cases, the radar systems may be lidar systems.

The radar systems may be configured to determine the velocity, range, locations, and/or angle of objects on land, sea, or in the air. The radar system may include a transmitter that transmits the radar signal 210 and a receiver or sensor that receives a reflected radar signal. The radar system may be configured to determine characteristics of objects based on differences between the transmitted radar signal and the received radar signal. As the number of radar systems in the environment 200 increases, a radar system in the environment 200 may experience additional interference. Interference in a crowded environment may reduce the effectiveness of radar systems. Such interference may impair self-driving vehicles or vehicles with advanced driver-assistance systems to the point that such systems can no longer be used effectively.

Techniques are described herein for allowing one or more vehicles 205 or radar systems in the environment 200 to detect (e.g., passively detect or listen) for radar signals from other vehicles 205 and/or other radar systems, and determine spatial parameters of objects based on the passively received radar signals. A primary vehicle (or UE incorporated into the primary vehicle) may be configured to receive one or more radar signals from one or more secondary vehicles (or UEs incorporated into the secondary vehicles). The primary vehicle may be configured to determine one or more spatial parameters (e.g., velocity, range, location, and/or angle) of the secondary vehicle based on the passively received radar signals. In some cases, the primary vehicle may receive an indication that identifies at least some communication resources to be used by the secondary vehicle to transmit the radar signals. The primary vehicle may determine one or more driving operations based on the spatial parameter.

Figure 3:
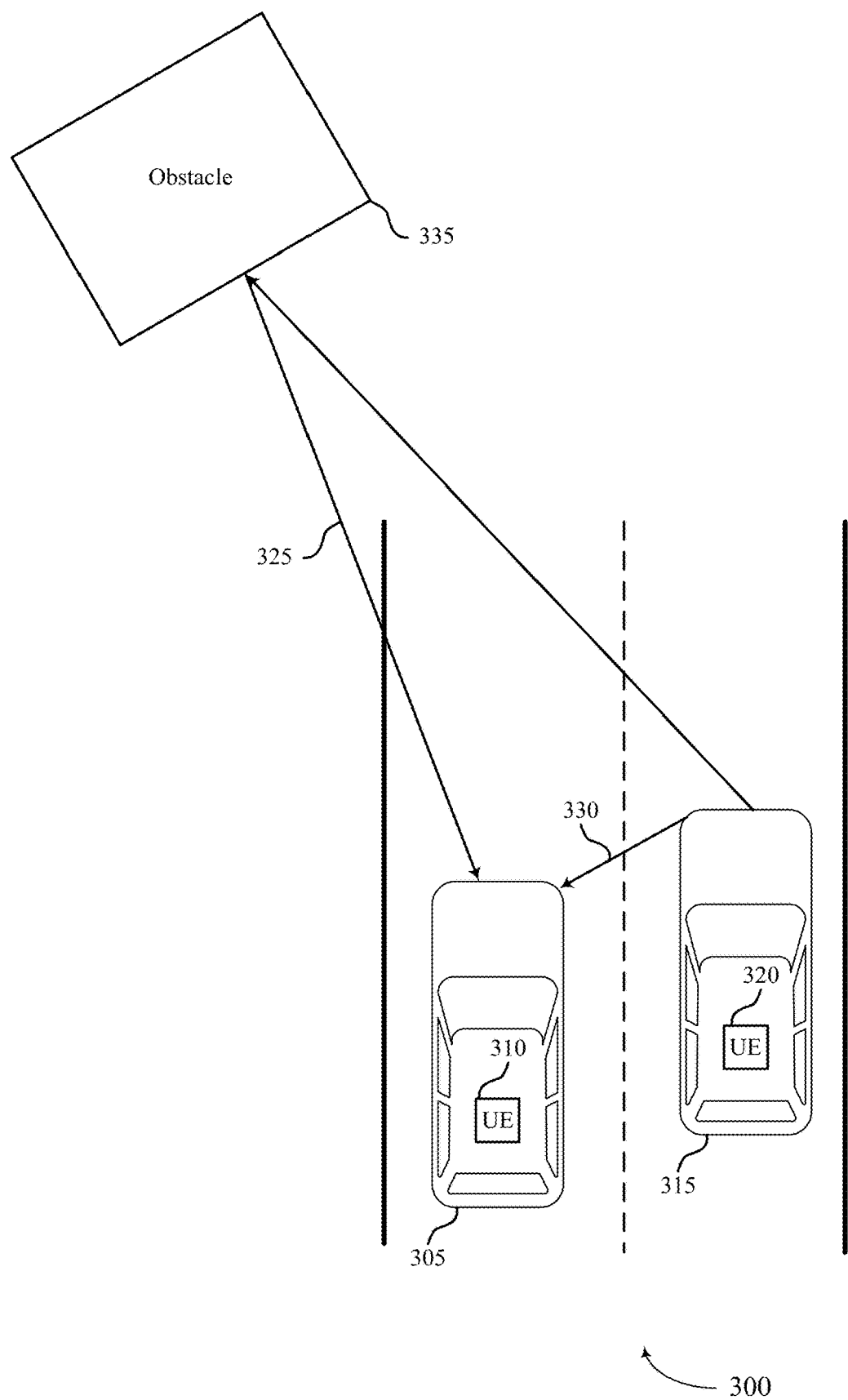
FIG. 3 illustrates an example of a system that supports signaling for radar systems in accordance with aspects of the present disclosure.

FIG. 3 illustrates an example of a system 300 that supports signaling for radar systems in accordance with aspects of the present disclosure. In some examples, the system 300 may implement aspects of the wireless communications system 100. The system 300 may illustrate techniques that enable a primary vehicle 305 that incorporates a first UE 310 in a wireless communication system to use radar signals transmitted by a secondary vehicle 315 that incorporates a second UE 320.

The system 300 illustrates how the primary vehicle 305 may use a reflected radar signal 325 and/or an unreflected radar signal 330 transmitted by the secondary vehicle 315 to determine one or more spatial parameters about the secondary vehicle 315. The primary vehicle 305 may be configured to use any quantity or any combination of reflected radar signal(s) 325 and/or unreflected radar signal(s) 330 (e.g., radar signals that travels directly from another source, such as a vehicle or a UE of a vehicle) to determine spatial parameters of the secondary vehicle 315. In some cases, the primary vehicle 305 may be configured to use a quantity of unreflected radar signal(s) 330 from a first source (e.g., vehicle 315) with a quantity of reflected radar signal(s) 325 from a second source that may be the same (e.g., vehicle 315) or different another source, such as another vehicle (not shown).

To use radar signals transmitted by the secondary vehicle 315, the primary vehicle 305 may have to know when such radar signals are being transmitted. In some cases, the secondary vehicle 315 may transmit an indication about communication resources that may be used to transmit radar signals to the primary vehicle 305. For example, the indication may include a resource use pattern or a frequency hopping pattern for transmitting one or more radar signals. Using that information, the primary vehicle 305 may be configured to identify one or more spatial parameters about the secondary vehicle 315 using radar signals transmitted by the secondary vehicle 315, where the radar signals are transmitted according to the resource use pattern.

The primary vehicle 305 may be configured to determine spatial parameters about the secondary vehicle 315 using one or more reflected radar signals 325 that are reflected off of an obstacle 335. To use a reflected radar signal 325, the primary vehicle 305 may need to know information about the obstacle 335. The obstacle 335 may be any object in the environment that is capable of reflecting radar signals. In ground-based vehicle environments, examples of objects may include, buildings, moving vehicles, stationary vehicles, signs, or other objects.

Reflected radar signals 325 may be useful to the primary vehicle 305 to determine spatial parameters about the secondary vehicle 315 if some characteristics of the obstacle 335 that reflected the radar signal 325 are known by the primary vehicle 305. For example, if the obstacle 335 is stationary and/or if the primary vehicle 305 knows a location of the obstacle 335, the primary vehicle 305 may be configured to use the reflected radar signal 325 to identify spatial parameters of the secondary vehicle 315. Examples of other characteristics of the obstacle 335 that may be useful to the primary vehicle 305 may include a shape of the obstacle 335, a type of the obstacle 335, dimensions of the obstacle 335, dimensions of one or more surfaces of the obstacle 335, locations of one or more surfaces of the obstacle 335, data about past radar signals reflected off of the obstacle 335, or a combination thereof.

To determine characteristics about the obstacle 335, the primary vehicle 305 may use map data or other external data sources. Additionally or alternatively, the primary vehicle 305 may use its own active radar. In some ground-based vehicle systems, map data may provide characteristics about obstacles 335, such as buildings, including location, dimensions, shape, relative positioning, etc.

To identify spatial parameters about the secondary vehicle 315 using the reflected radar signals 325, the primary vehicle 305 may use information about the primary vehicle 305 and/or the obstacle 335 to extract the information about the secondary vehicle 315 from the received radar signals 325. For example, the primary vehicle 305 may use the location of the obstacle 335 and the doppler shift caused by the primary vehicle 305 to identify a doppler shift in the radar signal 325 caused by the secondary vehicle 315. Using the doppler shift caused by the secondary vehicle 315, the primary vehicle 305 may be configured to determine one or more spatial parameters (e.g., velocity, range, location, and/or angle) of the secondary vehicle 315.

Additionally or alternatively, a primary vehicle 305 may be configured to determine spatial parameters about the secondary vehicle 315 using one or more unreflected radar signals 330. An unreflected radar signal 330 may be a radar signal that travels directly from the secondary vehicle 315 to the primary vehicle 305 without being reflected by another object or obstacle.

To identify useful information from the unreflected radar signal 330, the primary vehicle 305 may need to know information about the transmission parameters of the unreflected radar signal 330. For example, the primary vehicle 305 may need to know a frequency used to transmit the radar signal 330 and a transmission time of the radar signal 330. In some cases, a clock or other timing parameter may be communicated and/or coordinated between the primary vehicle 305 and the secondary vehicle 315. Using a synced clock or some other form of coordination, the primary vehicle 305 may receive and be configured to compare reception parameters of the radar signal 330 to transmission parameters of the radar signal 330, and thereby determine spatial parameters about the secondary vehicle 315.

A variety of techniques may be used to synchronize or coordinate clocks or other parameters between the primary vehicle 305 and the secondary vehicle 315. For example, a schedule coordinator of a managed network (e.g., global positioning system (GPS) or cellular network) may signal a clock to both the primary vehicle 305 and the secondary vehicle 315. In another example, the primary vehicle 305 may be configured to infer a clock of the secondary vehicle 315 based on receiving a plurality of radar signals.

Figure 4:
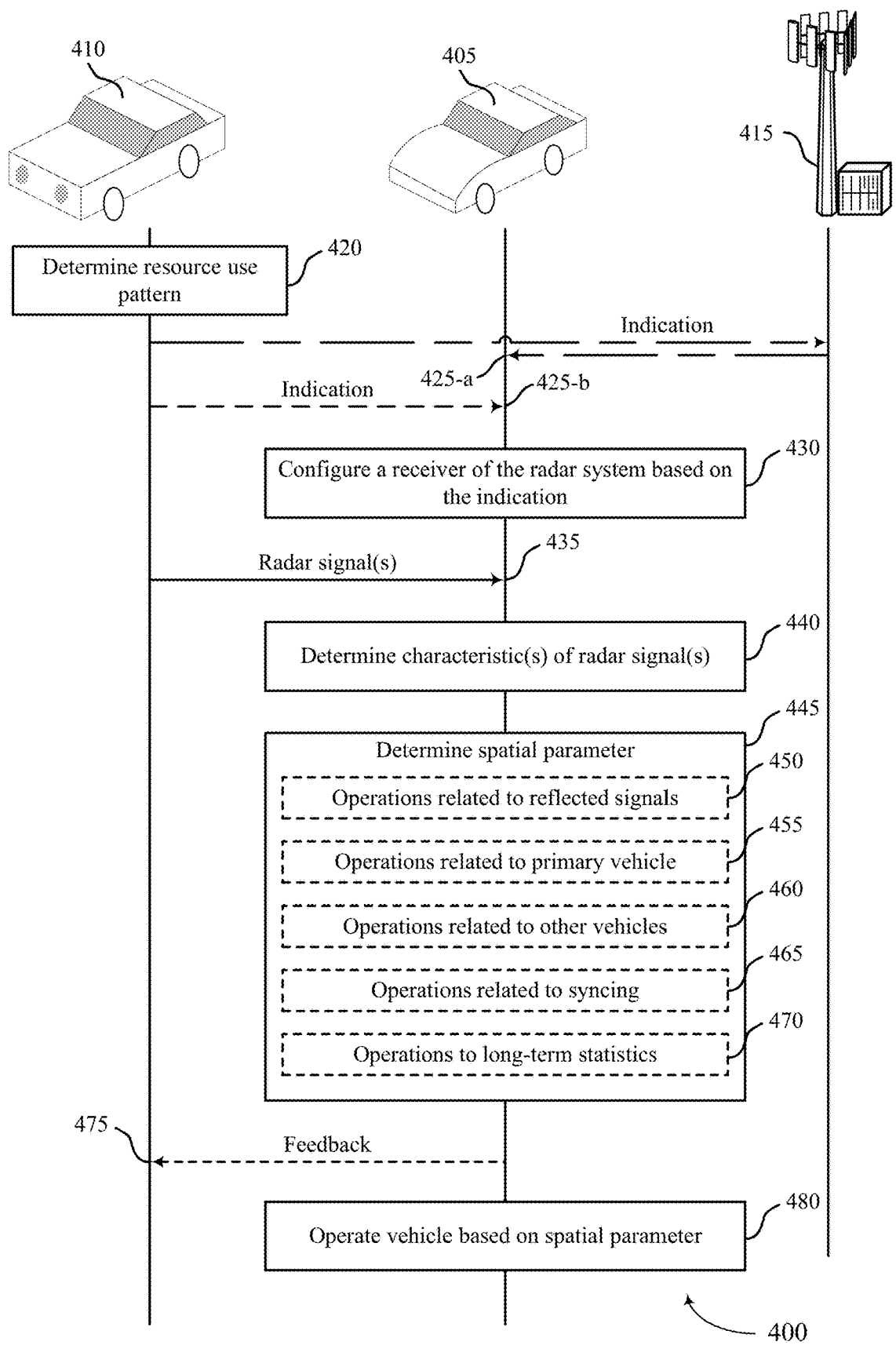
FIG. 4 illustrates an example of a process flow that supports signaling for radar systems in accordance with aspects of the present disclosure.

FIG. 4 illustrates an example of a process flow 400 that supports signaling for radar systems in accordance with aspects of the present disclosure. In some examples, the process flow 400 may implement aspects of the wireless communications system 100. The process flow may illustrate techniques that enable a primary vehicle 405 to use one or more radar signals transmitted by a secondary vehicle 410. In some cases, the primary vehicle 405 and/or the secondary vehicle 410 may communicate with a scheduling entity 415, such as a base station, of a wireless network (e.g., Wi-Fi, a Bluetooth, a 3G, a 4G, a 5G, a Zigbee, dedicated short range communications (DSRC), or vehicle-to-everything (V2X) network).

The process flow 400 may be broken up into two phases. In a first phase, the resource pattern of the secondary vehicle 410 is communicated to one or more other vehicles including the primary vehicle 405. In a second phase, the primary vehicle 405 is configured to use the resource use pattern to detect one or more radar signals transmitted by the secondary vehicle 410 and determine spatial parameters of the secondary vehicle 410 using such radar signals.

At block 420, the secondary vehicle 410 may determine a resource use pattern for its radar system. The resource use pattern may indicate which radio frequency spectrum bands may be used to transmit one or more radar signals, what time and/or duration such one or more radar signals may be transmitted, the system that will transmit the one or more radar signals, the direction of transmission of the one or more radar signals, or a combination thereof. The resource use pattern may be an example of a frequency hopping pattern, a spreading code pattern, or a combination thereof.

The secondary vehicle 410 may transmit an indication 425 (e.g., indication 425-a or indication 425-b) that includes information about the resource use pattern for the one or more radar signals. The resource use pattern may be used by other vehicles or UEs (e.g., the primary vehicle 405) to use the one or more radar signals transmitted by the secondary vehicle 410 to determine spatial parameters of the secondary vehicle. Such actions may reduce the interference in an environment with a plurality of radar systems operating in close proximity (e.g., a road) by reducing the number of radar signals being transmitted in the environment at any given time. The indication 425 (e.g., indication 425-a or indication 425-b) may be communicated in a variety of different ways.

In some cases, the indication 425-a may be communicated using an out-of-band signal of the radar system. In such cases, the indication 425-a may be communicated using a radio access technology (RAT) that is different than the radar RAT. For example, the indication 425-a may be communicated using a Wi-Fi RAT, a Bluetooth RAT, a 3G RAT, a 4G RAT, a 5G RAT, a Zigbee RAT, a DSRC RAT, a V2X RAT, or a combination thereof. The secondary vehicle 410 may transmit the indication 425-a to the scheduling entity 415 (e.g., the base station of RAT) of a network using a first message or transmission. The scheduling entity 415 may then transmit the indication 425-a to the primary vehicle 405 and/or other vehicles or UEs using a second message or transmission. In such scenarios, both the primary vehicle 405 and the secondary vehicle 410 may configured to communicate using the same RAT. The out-of-band signals used to communicate the indication 425-a may take place at a lower carrier frequency than the one or more radar signals and may use a smaller bandwidth than the one or more radar signals.

In some cases, the indication 425-b may be communicated using an in-band signal of the radar system. In such cases, the indication 425-b may be communicated using a radar signal. A radar signal may include one or more components. A first component of the radar signal may include a time domain sequence that facilitates object detection. The second component may include a communication signal that is modulated using a modulation scheme. The third component may include the digital information that is modulated into the radar signal, such as a resource use pattern of the one or more radar signals of the secondary vehicle 410.

In some cases, the primary vehicle 405 may infer the resource use pattern of the secondary vehicle 410 by detecting a plurality of radar signals (or a plurality of instances of the same radar signal) transmitted by the secondary vehicle 410. The primary vehicle 405 may listen for radar signals for a duration to infer the resource hopping pattern. In such cases, the radar signals may be encoded with some identifying information, such as an identifier of the entity that transmitted the radar signal and/or other information that may be used for inferring the resource use pattern.

At block 430, the primary vehicle 405 may configure a receiver of a radar system of the primary vehicle 405 based on receiving the indication 425 (e.g., indication 425-a or indication 425-b). The primary vehicle 405 may use matched filters or other similar technology to tune its radar system to the radar signals being transmitted by the secondary vehicle 410. The tuning or filtering may be based on resource use pattern communicated in the indication 425 (e.g., indication 425-a or indication 425-b).

The primary vehicle 405 may receive one or more radar signals 435 transmitted by the secondary vehicle 410 based on configuring the receiver. Examples of configuring the receiver to receive may include the primary vehicle 405 listening in a particular direction for the one or more radar signals 435, tuning to a particular frequency spectrum band to receive the one or more radar signals 435, and/or applying particular encoding algorithms to the radar signal to decode the radar signal. In some cases, the receiver may be a radar device that is configured to transmit and/or receive radar signals. In some cases, the receiver may be positioned in a front of a vehicle (e.g., front bumper). The one or more radar signals 435 may be configured to facilitate detection of objects in an environment. In particular, the one or more radar signals 435 may be configured to be used by the secondary vehicle 410 in its active radar system, but here, the primary vehicle 405 may passively listen to these same one or more radar signals 435 to gather information. The one or more radar signals 435 may be unreflected radar signals, reflected radar signals, or a combination thereof.

At block 440, the primary vehicle 405 may determine one or more characteristics of the one or more radar signals 435. Examples of the measured characteristics of the one or more radar signals 435 may include a doppler shift, a time of flight, an angle of arrival, a phase shift, or a combination thereof. These characteristics may be used to determine spatial parameters. A processor or other computing device coupled with the receiver may be configured to determine the one or more characteristics of the one or more radar signals 435.

At block 445, the primary vehicle 405 may use the characteristics of the one or more radar signals 435 to determine one or more spatial parameters of the secondary vehicle 410. Examples of the spatial parameters may include the velocity of the secondary vehicle 410, a distance between the primary vehicle 405 and the secondary vehicle 410, a direction of travel of the secondary vehicle 410 relative to the primary vehicle 405, a position of the secondary vehicle 410 relative to the primary vehicle 405, or a combination thereof. Using some of these first-order spatial parameters, the primary vehicle 405 may be configured to determine one or more second-order spatial parameters. For example, the primary vehicle 405 may use its own position, the distance between the primary vehicle 405 and the secondary vehicle 410, and the position of the secondary vehicle 410 relative to the primary vehicle 405 to determine an absolute position (e.g., earth-centered, earth-fixed (ECEF) coordinates or latitude, longitude, altitude (LLA) coordinates of the secondary vehicle 410). Using such techniques, the primary vehicle may be configured to determine a position of the secondary vehicle 410 in a fixed reference frame (e.g., ECEF or LLA coordinates), a speed of the secondary vehicle 410 in a fixed reference frame (e.g., miles-per-hour or kilometers-per-hour), a direction of travel in a fixed reference frame (e.g., north or southeast), or a combination thereof. These fixed reference frames may be different than a reference frame of data that is relative to the primary vehicle 405.

The primary vehicle 405 may be configured to perform one or more optional operations as part of using the one or more radar signals transmitted by the secondary vehicle 410 to determine the spatial parameters. The one or more optional operations described herein may be performed in any combination.

At block 450, the primary vehicle 405 may perform one or more operations related to reflected radar signals. In some cases, the primary vehicle 405 may receive radar signals 435 transmitted by the secondary vehicle 410 that have been reflected off of objects, obstacles, or clutter in the environment. When primary vehicle 405 knows the location of the object that reflects the radar signals 435 and/or other characteristics of the object, the primary vehicle 405 may be configured to use that information to determine spatial parameters about the secondary vehicle 410.

For example, radar signals may be reflected off of a stationary clutter object as observed by the primary vehicle 405. The location of the stationary clutter object may be observed by the primary vehicle 405 using map data, radar data, or a combination thereof. Because the clutter object is stationary, the doppler shift in the reflected radar signal may be a function of the movement of the transmitting vehicle (e.g., secondary vehicle 410) and the movement of the receiving vehicle (e.g., primary vehicle 405). The primary vehicle 405 may determine its own velocity using other sensors available in the primary vehicle 405 (e.g., wheel speed sensors or inertial measurement unit). The primary vehicle 405 may remove or filter out the doppler shift caused by the primary vehicle 405 from the reflected radar signal. The remaining doppler shift may then be caused solely by the movement of the secondary vehicle 410. Hence, from the doppler shift of the reflected radar signal, the primary vehicle 405 may determine the velocity of the secondary vehicle 410. In some cases, the primary vehicle 405 may also detect the angle of arrival of the radar signal from the secondary vehicle 410.

In some cases, the primary vehicle 405 may be configured to determine spatial parameters of the secondary vehicle 410 based solely on reflected radar signals 435. Typically, such reflected radar signals may be interference, but the additional information provided by the stationary object in the environment that reflects radar signals may be used to identify additional spatial parameters or refine the determination of the spatial parameters.

At block 455, the primary vehicle 405 may perform one or more operations related to the primary vehicle 405. For example, the primary vehicle 405 may determine one or more spatial parameters about the primary vehicle 405 and filter properties related to those spatial parameters out of the one or more radar signals 435 transmitted by the secondary vehicle 410. For example, the primary vehicle 405 may be configured to filter out a doppler shift from the received radar signals that was caused by the movement of the primary vehicle 405.

At block 460, the primary vehicle 405 may perform one or more operations related to other vehicles present in the environment. In some multi-car environments, there may be more than one vehicle near the primary vehicle 405. In such environments, one or more radar signals from one or more other neighboring vehicles may interfere with the one or more radar signals transmitted by the secondary vehicle 410. The primary vehicle 405 may receive a plurality of indications about the resource use patterns of the plurality of neighboring vehicles. The primary vehicle 405 may be configured to filter out the non-targeted radar signals transmitted by other neighboring vehicles when detecting the one or more radar signals 435 transmitted by the secondary vehicle 410. In some examples, the primary vehicle 405 may use a minimum mean square error technique to filter out the other radar signals. In some cases, the primary vehicle 405 may configure its receiver of the radar system based on the resource use pattern of two or more vehicles.

At block 465, the primary vehicle 405 may perform one or more operations related to synchronizing operations of the primary vehicle 405 and the secondary vehicle 410. To accurately determine spatial parameters, the receiving vehicle (e.g., the primary vehicle 405) may need to know some information about the transmission parameters (e.g., transmission time, frequency resources used for transmission) of the one or more radar signals 435. For example, the primary vehicle 405 may determine one or more characteristics of the radar signal by comparing transmission parameters of the one or more radar signals 435 to reception parameters of the one or more radar signals 435. Knowing transmission parameters may not be enough, however, if the clock and/or systems of the primary vehicle 405 are independent from the clock and/or systems of the secondary vehicle 410. Consequently, the transmissions of the one or more radar signals may be coordinated in some way or the clocks of the vehicles may be synced in some way, or both, to facilitate determinations of the characteristics of the one or more radar signals 435.

In some examples, the clocks of the primary vehicle 405 and the secondary vehicle 410 may be coordinated using an external manager, such as the scheduling entity 415. In such cases, the primary vehicle 405 and the secondary vehicle 410 may receive one or more clock signals or control signaling from the scheduling entity 415 of the external network. The primary vehicle 405 and the secondary vehicle 410 may set clocks or parameters based on the received signals. Examples of external networks that may coordinate clocks or transmission between vehicles or UEs may be a GPS system, a cellular network, a Wi-Fi network, a V2X network, another type of network, or combinations thereof. The one or more radar signals may be encoded with time-stamp information so that a receiving vehicle (e.g., primary vehicle 405) may be able to compare transmission parameters to reception parameters of the one or more radar signals 435. The primary vehicle 405 may determine transmission parameters based on the time-stamp encoded in the radar signal 435. The primary vehicle 405 may determine reception parameters based on measuring one or more characteristics of the radar signal 435 (e.g., time of arrival, angle of arrival, strength of arrival, etc.).

In some cases, the clocks of the primary vehicle 405 and the secondary vehicle 410 may be coordinated using one or more radar signals. The primary vehicle 405 and the secondary vehicle 410 may detect enough radar signals from each other to have a coordinated clock or at least know about the clock of the other entity. In such cases, the radar signals may be encoded with various data including clock data, time-stamp data, etc.

At block 470, the primary vehicle 405 may be configured to perform one or more operations related to gathering long-term statistics about the one or more radar signals 435. Using one or more radar signals transmitted by the secondary vehicle 410 may yield measurements that include noise. The primary vehicle 405 may experience interference, false positives, erroneous attributions, and/or may apply processing related to the secondary vehicle 410 to radar signals that were transmitted by vehicles other than the secondary vehicle 410. Such conditions may yield noisy data. To address such issues, the primary vehicle 405 may analyze data collected over a duration and may reject outliers or variations in the data that satisfy a threshold. The primary vehicle 405 may store data related to received radar signals and/or spatial parameters over a duration. The primary vehicle 405 may apply algorithms or operations to the stored data to reject outliers and/or identify data that relates to the desired radar signals and/or the desired secondary vehicle.

The primary vehicle 405 may optionally transmit feedback information 475 to the secondary vehicle 410 based on identifying one or more spatial parameters of the secondary vehicle 410. Such feedback information 475 may be used to continue to track spatial parameters of the secondary vehicle 410 or to seek acknowledgement or verification of the spatial parameters from the secondary vehicle 410. The feedback information 475 may be communicated using an in-band signal of the radar system (e.g., a radar signal encoded with information) or an out-of-band signal of the radar system (e.g., a signal communicated using Wi-Fi, 3G, 4G, 5G, or a V2X network). In some cases, the primary vehicle 405 and the secondary vehicle 410 may establish a communication link (e.g., a directional communication link) to directly exchange measured spatial parameters with each. In some cases, such communications may supplement and/or replace the spatial parameters determined using the one or more radar signals 435.

At block 480, the primary vehicle 405 may operate the vehicle based on the spatial parameters determined about the secondary vehicle 410. For example, the primary vehicle 405 may initiate one or more commands to ensure that the primary vehicle 405 does not collide with or needlessly impede the movement of the secondary vehicle 410.

Figure 5:
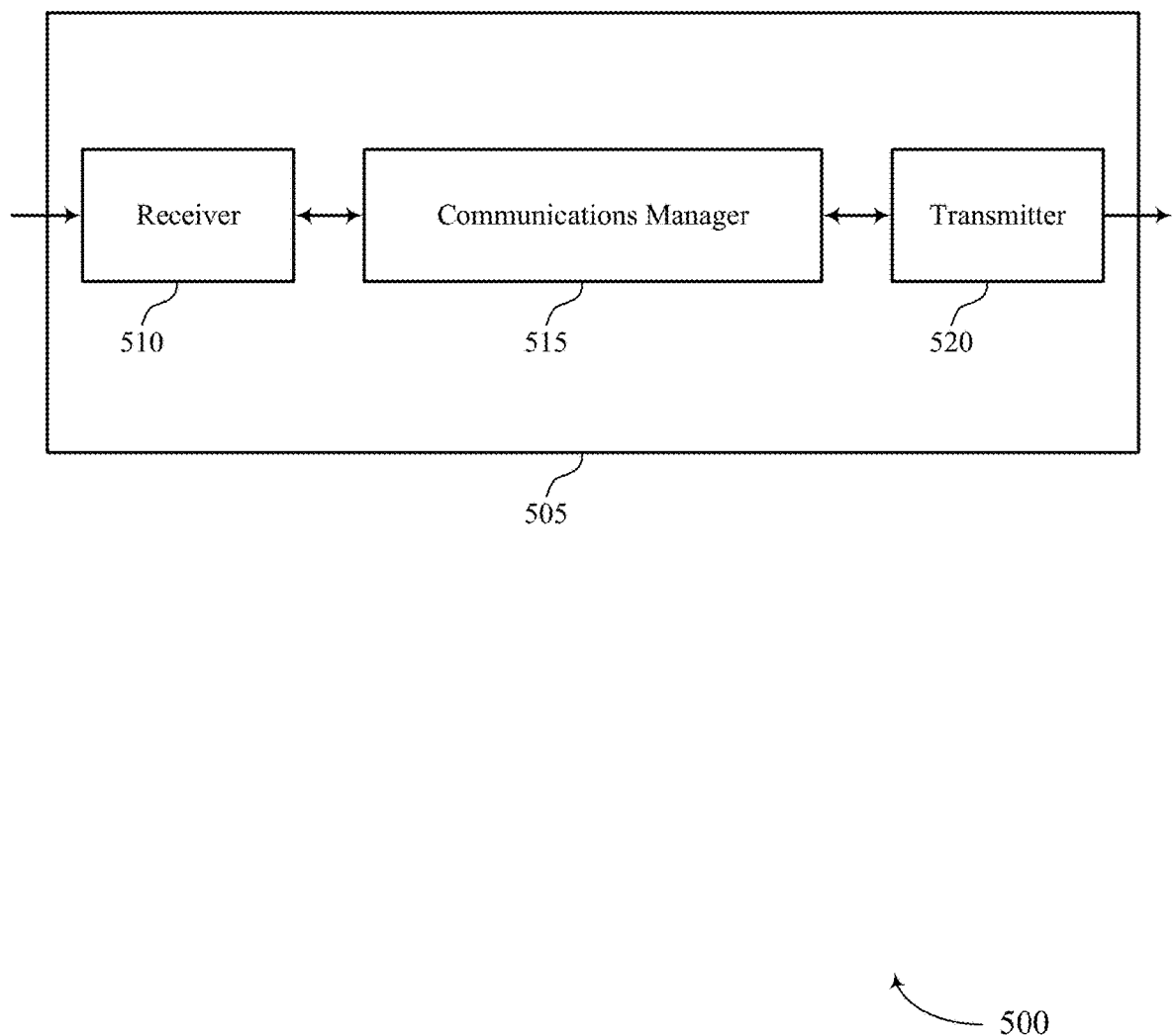
FIGS. 5 and 6 show block diagrams of devices that support signaling for radar systems in accordance with aspects of the present disclosure.

FIG. 5 shows a block diagram 500 of a device 505 that supports signaling for radar systems in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to signaling for radar systems, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, by a first UE associated with a first vehicle, an indication of a resource use pattern of a radar signal transmitted by a second UE associated with a second vehicle, configure a receiver of the first UE based on receiving the indication of the resource use pattern, receive the radar signal transmitted by the second UE based on configuring the receiver, and determine a spatial parameter about the second UE based on receiving the radar signal transmitted by the second UE. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
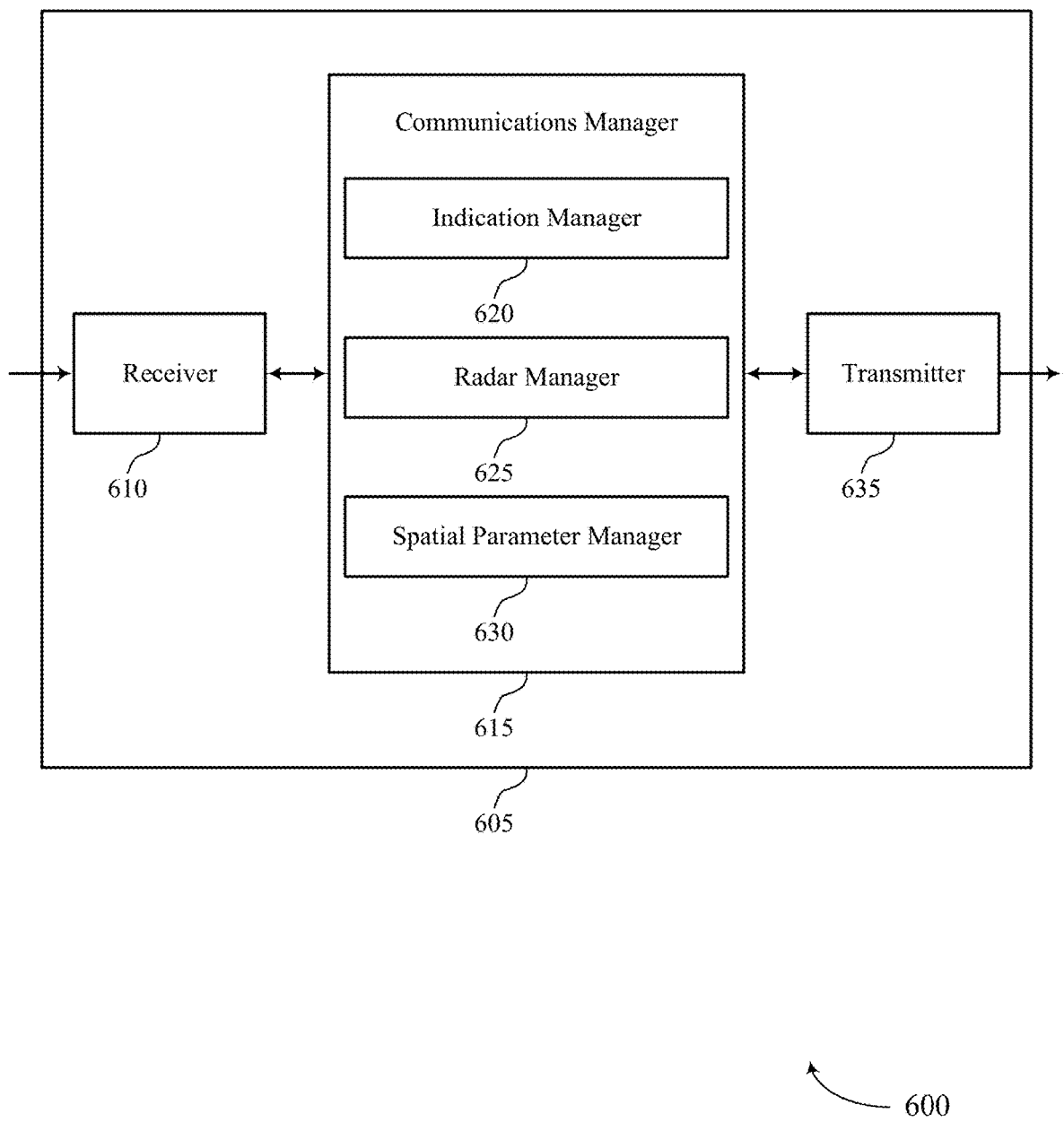

FIG. 6 shows a block diagram 600 of a device 605 that supports signaling for radar systems in accordance with aspects of the present disclosure. The device 605 may be an example of aspects of a device 505 or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to signaling for radar systems, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an indication manager 620, a radar manager 625, and a spatial parameter manager 630. The communications manager 615 may be an example of aspects of the communications manager 810 described herein.

The indication manager 620 may receive, by a first UE associated with a first vehicle, an indication of a resource use pattern of a radar signal transmitted by a second UE associated with a second vehicle.

The radar manager 625 may configure a receiver of the first UE based on receiving the indication of the resource use pattern and receive the radar signal transmitted by the second UE based on configuring the receiver.

The spatial parameter manager 630 may determine a spatial parameter about the second UE based on receiving the radar signal transmitted by the second UE.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
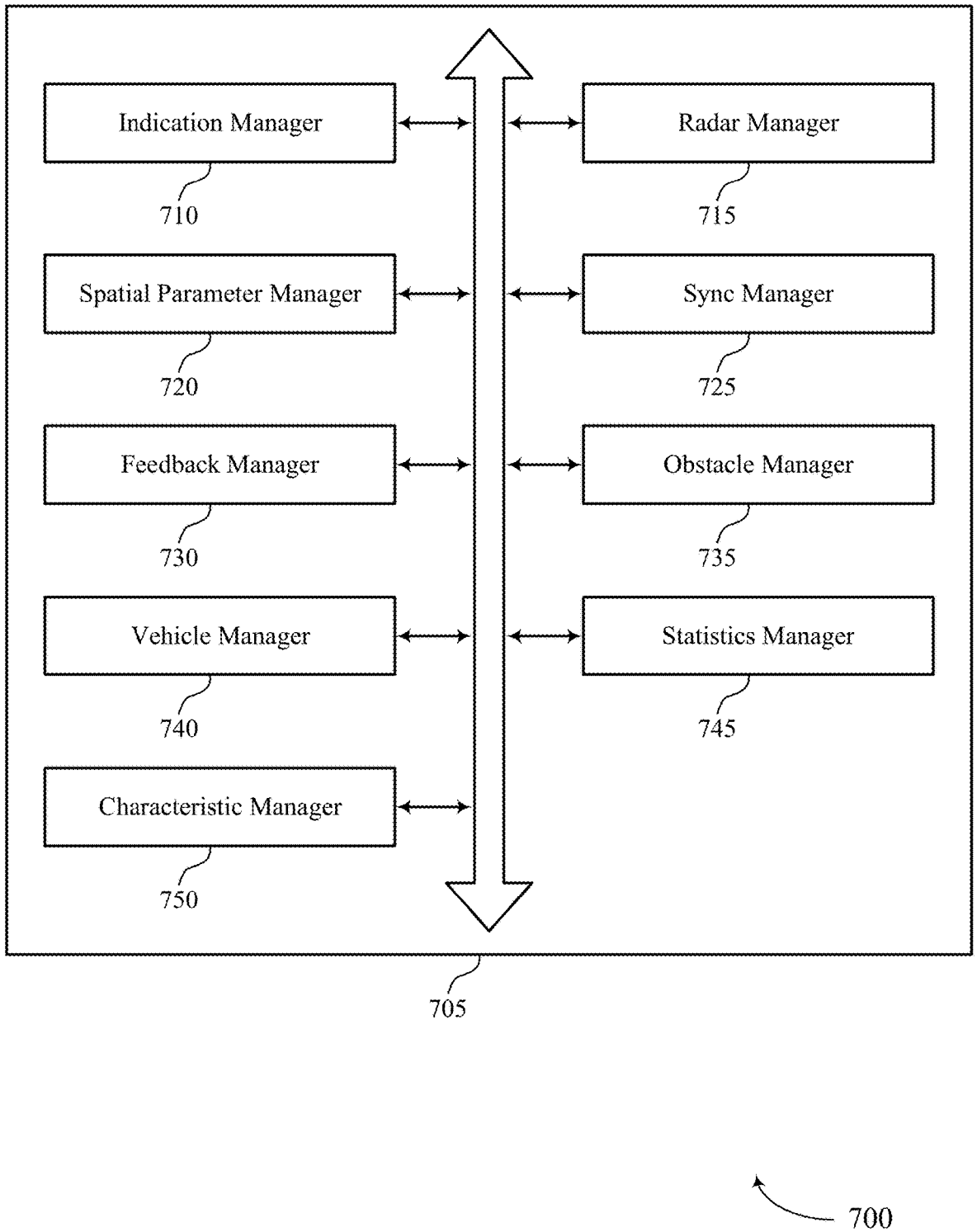
FIG. 7 shows a block diagram of a communications manager that supports signaling for radar systems in accordance with aspects of the present disclosure.

FIG. 7 shows a block diagram 700 of a communications manager 705 that supports signaling for radar systems in accordance with aspects of the present disclosure. The communications manager 705 may be an example of aspects of a communications manager 515, a communications manager 615, or a communications manager 810 described herein. The communications manager 705 may include an indication manager 710, a radar manager 715, a spatial parameter manager 720, a sync manager 725, a feedback manager 730, an obstacle manager 735, a vehicle manager 740, a statistics manager 745, and a characteristic manager 750. Each of these modules may communicate, directly or indirectly, with one another (e.g., via one or more buses).

The indication manager 710 may receive, by a first UE associated with a first vehicle, an indication of a resource use pattern of a radar signal transmitted by a second UE associated with a second vehicle. In some examples, the indication manager 710 may receive, by the first UE, a second indication of a second resource use pattern of radar signals transmitted by a third UE associated with a third vehicle.

In some examples, the indication manager 710 may receive a signal that includes the indication, the signal being communicated using a different radio frequency spectrum band than the radar signal. In some cases, the signal is modulated using a Wi-Fi RAT, a Bluetooth RAT, a 3G RAT, a 4G RAT, a 5G RAT, a Zigbee RAT, a DSRC RAT, a V2X RAT, or a combination thereof.

In some cases, the resource use pattern includes information regarding frequency resources for use by the second UE to transmit radar signals, time resources for use by the second UE to transmit radar signals, a direction of transmission of radar signals transmitted by the second UE, or a combination thereof. The radar manager 715 may configure a receiver of the first UE based on receiving the indication of the resource use pattern.

In some examples, the radar manager 715 may receive the radar signal transmitted by the second UE based on configuring the receiver. In some examples, the radar manager 715 may configure the receiver to filter out the radar signals transmitted by the third UE based on receiving the radar signal transmitted by the second UE.

In some examples, the radar manager 715 may receive a second radar signal that includes the indication, the second radar signal being encoded with information about the resource use pattern of radar signals transmitted by the second UE. In some examples, the radar manager 715 may receive a second radar signal transmitted by the second UE, the second radar signal being reflected off of an obstacle.

In some examples, the radar manager 715 may determine a transmit parameter of the radar signal based on receiving the radar signal and the second radar signal transmitted by the second UE, where determining the spatial parameter about the second UE is based on determining the transmit parameter of the radar signal. In some cases, the second radar signal includes radar timing information, the indication of the resource use pattern, and information associated with the resource use pattern.

In some cases, the radar signal received from the second UE has been reflected off of a stationary obstacle, where determining the spatial parameter about the second UE is based on the radar signal being reflected off of the stationary obstacle. In some cases, the radar signal received from the second UE is an unreflected radar signal received directly from the second UE. In some cases, a resource use pattern for transmitting radar signals are unique to each UE in a network.

The spatial parameter manager 720 may determine a spatial parameter about the second UE based on receiving the radar signal transmitted by the second UE. In some examples, the spatial parameter manager 720 may determine a second spatial parameter for the first UE. In some examples, the spatial parameter manager 720 may filter the radar signal using the second spatial parameter, where determining the spatial parameter for the second UE is based on filtering the radar signal using the second spatial parameter. In some examples, the spatial parameter manager 720 may identify a Doppler shift of the radar signal reflected off of the stationary obstacle.

In some examples, the spatial parameter manager 720 may filter components of the Doppler shift of the radar signal contributed by movement of the first UE, where determining the spatial parameter about the second UE is based on filtering the components of the Doppler shift of the radar signal contributed by the movement of the first UE. In some cases, the spatial parameter of the second UE includes a location of the second UE, a speed of the second UE, a direction of travel of the second UE, a velocity of the second UE, or a combination thereof.

The sync manager 725 may receive sync information. In some examples, the sync manager 725 may determine a transmit parameter of the radar signal based on receiving the sync information, where determining the spatial parameter about the second UE is based on determining the transmit parameter of the radar signal.

The feedback manager 730 may transmit feedback to the second UE based on determining the spatial parameter of the second UE.

The obstacle manager 735 may identify a location of the stationary obstacle, where determining the spatial parameter about the second UE is based on identifying the location of the stationary obstacle. In some examples, the obstacle manager 735 may access map data to determine the location of the stationary obstacle relative to the first UE. In some examples, the obstacle manager 735 may transmit, by the first UE, a second radar signal. In some examples, the obstacle manager 735 may receive, by the first UE, a third radar signal reflected off of the stationary obstacle based on transmitting the second radar signal, where identifying the location of the stationary obstacle is based on receiving the third radar signal.

The vehicle manager 740 may operate a vehicle associated with the first UE based on determining the spatial parameter of the second UE.

The statistics manager 745 may store information related to a set of radar signals received from the second UE over time. In some examples, the statistics manager 745 may filter the stored information by rejecting outliers in the information, where determining the spatial parameter about the second UE is based on filtering the stored information.

The characteristic manager 750 may determine a characteristic of the radar signal based on receiving the radar signal, where determining the spatial parameter is based on determining the characteristic. In some cases, the characteristic includes a time of flight of the radar signal, a Doppler shift of the radar signal, or an angle of arrival of the radar signal, or a combination thereof.

Figure 8:
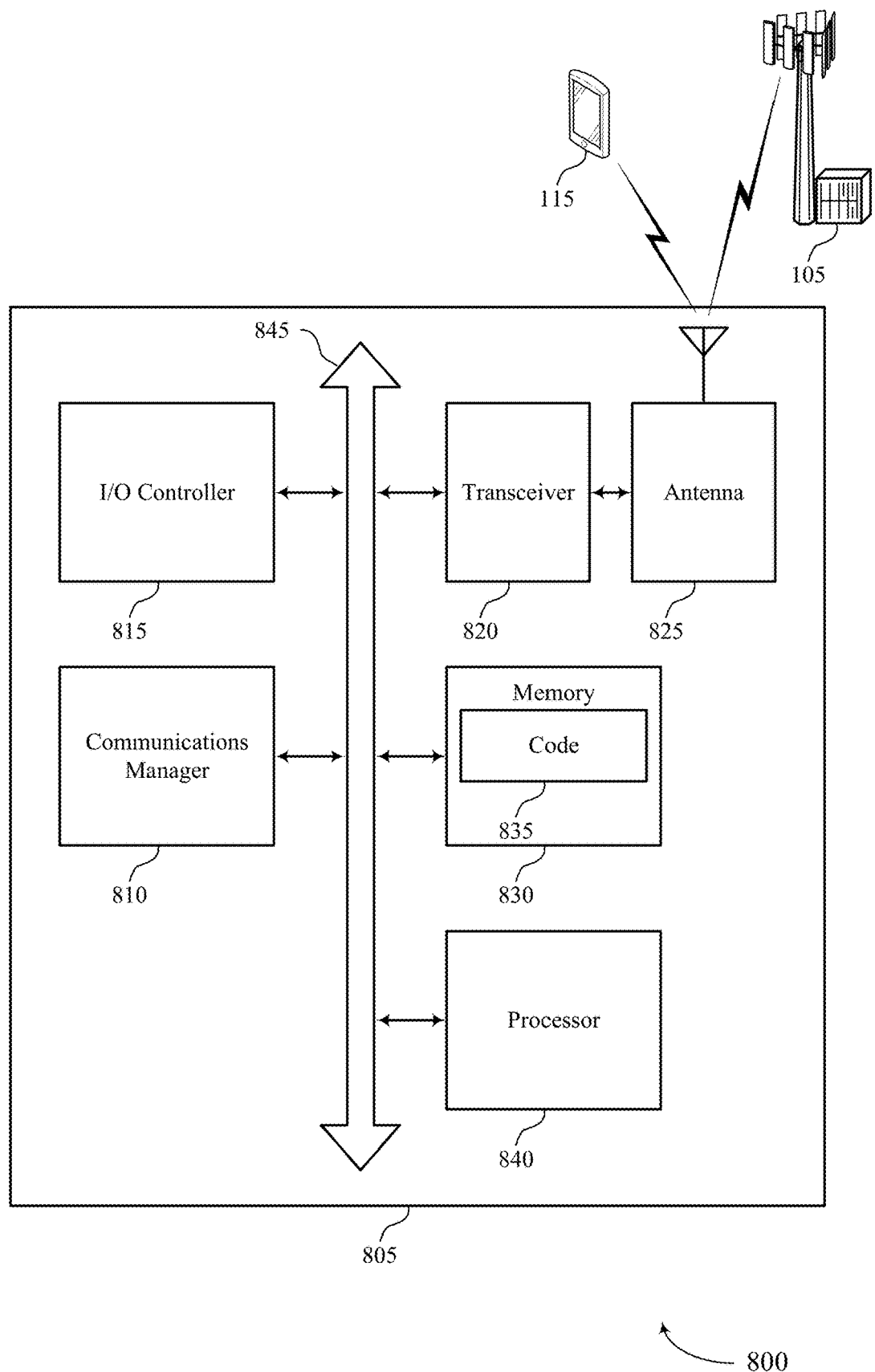
FIG. 8 shows a diagram of a system including a device that supports signaling for radar systems in accordance with aspects of the present disclosure.

FIG. 8 shows a diagram of a system 800 including a device 805 that supports signaling for radar systems in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, by a first UE associated with a first vehicle, an indication of a resource use pattern of a radar signal transmitted by a second UE associated with a second vehicle, configure a receiver of the first UE based on receiving the indication of the resource use pattern, receive the radar signal transmitted by the second UE based on configuring the receiver, and determine a spatial parameter about the second UE based on receiving the radar signal transmitted by the second UE.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting signaling for radar systems).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
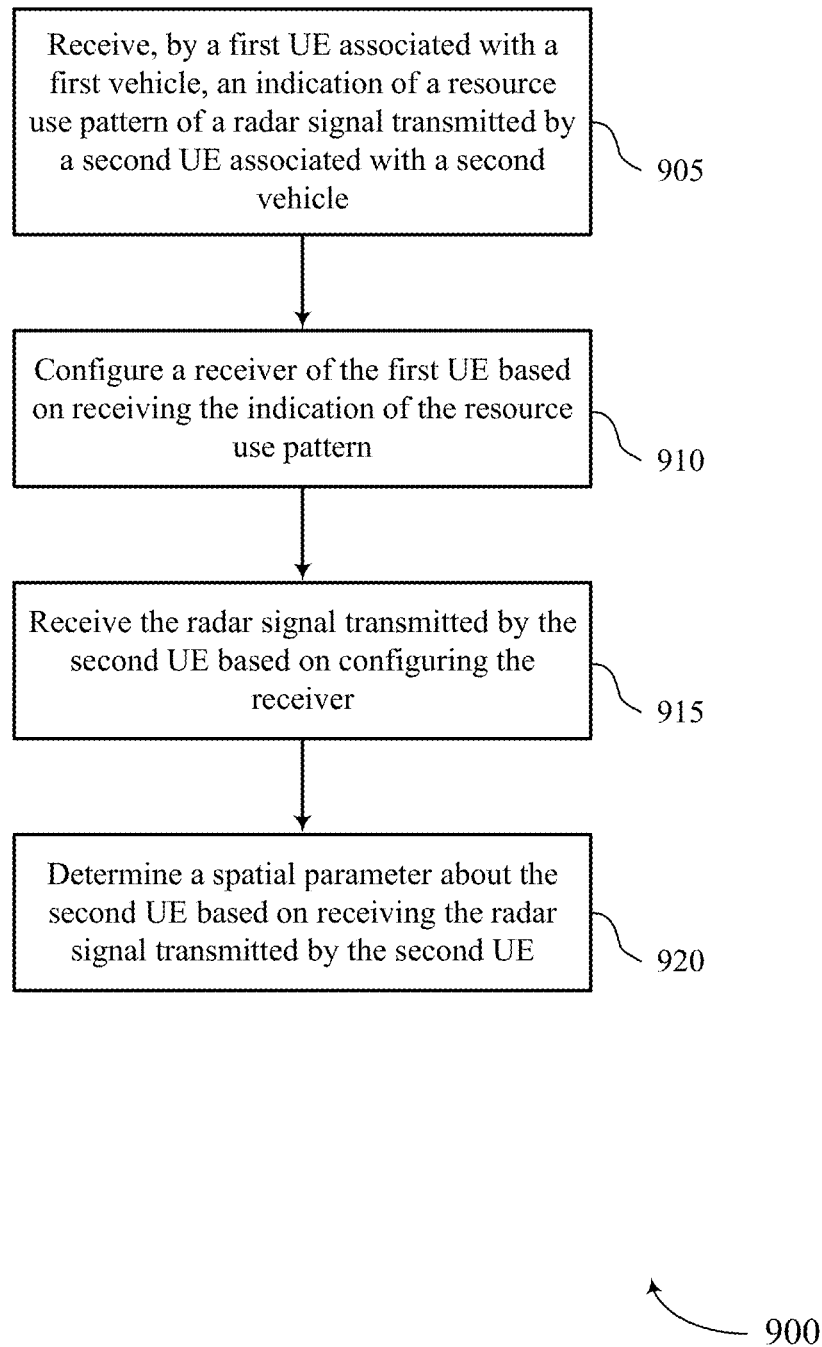
FIGS. 9 through 11 show flowcharts illustrating methods that support signaling for radar systems in accordance with aspects of the present disclosure.

FIG. 9 shows a flowchart illustrating a method 900 that supports signaling for radar systems in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may receive, by a first UE associated with a first vehicle, an indication of a resource use pattern of a radar signal transmitted by a second UE associated with a second vehicle. The operations of 905 may be performed according to the methods described herein. In some examples, aspects of the operations of 905 may be performed by an indication manager as described with reference to FIGS. 5 through 8.

At 910, the UE may configure a receiver of the first UE based on receiving the indication of the resource use pattern. The operations of 910 may be performed according to the methods described herein. In some examples, aspects of the operations of 910 may be performed by a radar manager as described with reference to FIGS. 5 through 8.

At 915, the UE may receive the radar signal transmitted by the second UE based on configuring the receiver. The operations of 915 may be performed according to the methods described herein. In some examples, aspects of the operations of 915 may be performed by a radar manager as described with reference to FIGS. 5 through 8.

At 920, the UE may determine a spatial parameter about the second UE based on receiving the radar signal transmitted by the second UE. The operations of 920 may be performed according to the methods described herein. In some examples, aspects of the operations of 920 may be performed by a spatial parameter manager as described with reference to FIGS. 5 through 8.

Figure 10:
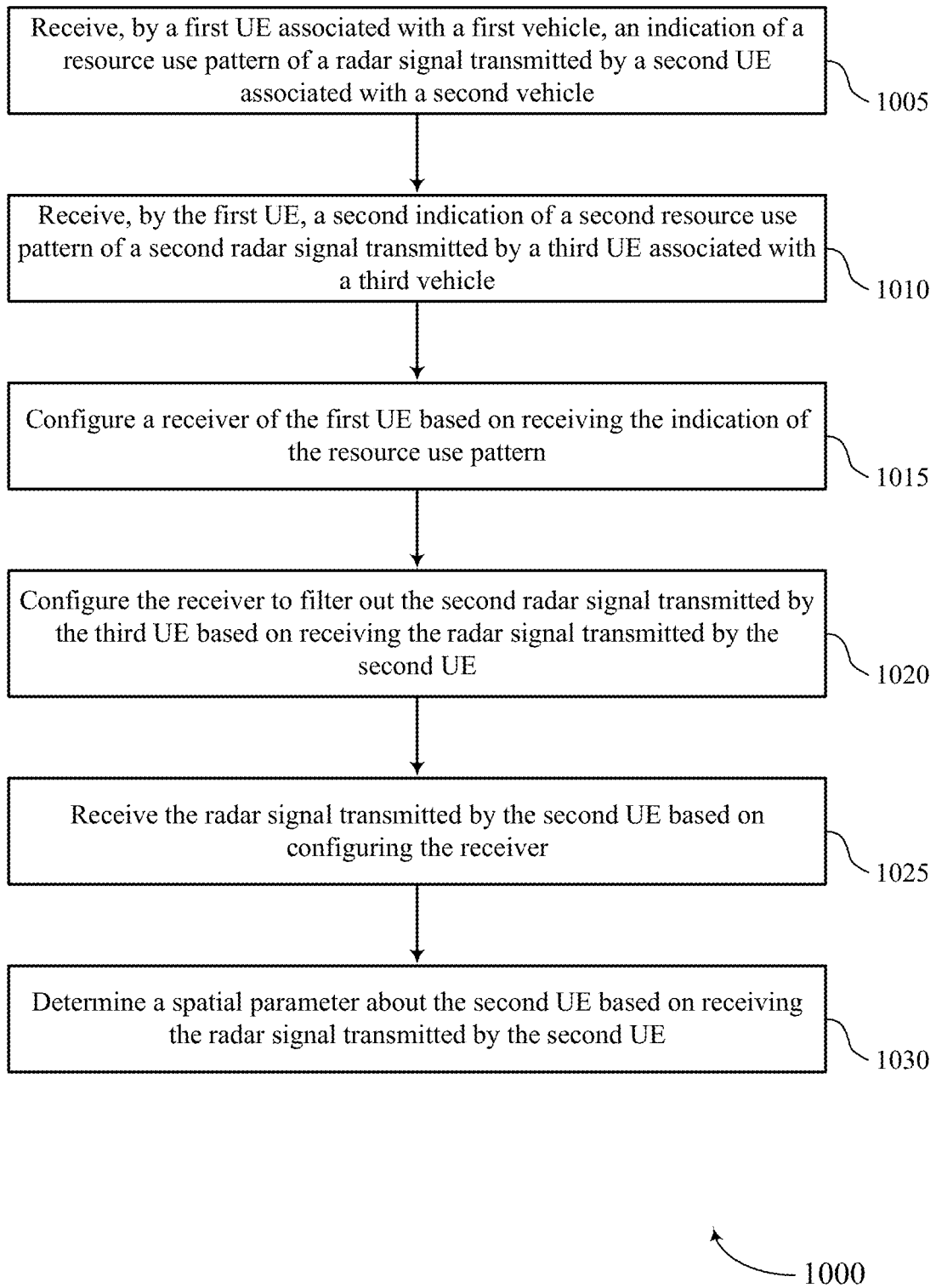

FIG. 10 shows a flowchart illustrating a method 1000 that supports signaling for radar systems in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may receive, by a first UE associated with a first vehicle, an indication of a resource use pattern of a radar signal transmitted by a second UE associated with a second vehicle. The operations of 1005 may be performed according to the methods described herein. In some examples, aspects of the operations of 1005 may be performed by an indication manager as described with reference to FIGS. 5 through 8.

At 1010, the UE may receive, by the first UE, a second indication of a second resource use pattern of a second radar signal transmitted by a third UE associated with a third vehicle. The operations of 1010 may be performed according to the methods described herein. In some examples, aspects of the operations of 1010 may be performed by an indication manager as described with reference to FIGS. 5 through 8.

At 1015, the UE may configure a receiver of the first UE based on receiving the indication of the resource use pattern. The operations of 1015 may be performed according to the methods described herein. In some examples, aspects of the operations of 1015 may be performed by a radar manager as described with reference to FIGS. 5 through 8.

At 1020, the UE may configure the receiver to filter out the second radar signal transmitted by the third UE based on receiving the radar signal transmitted by the second UE based on filtering the radar signals transmitted by the third UE. The operations of 1020 may be performed according to the methods described herein. In some aspects of the operations of 1020 may be performed by a radar manager as described with reference to FIGS. 5 through 8.

At 1025, the UE may receive the radar signal transmitted by the second UE based on configuring the receiver. The operations of 1025 may be performed according to the methods described herein. In some examples, aspects of the operations of 1025 may be performed by a radar manager as described with reference to FIGS. 5 through 8.

At 1030, the UE may determine a spatial parameter about the second UE based on receiving the radar signal transmitted by the second UE. The operations of 1030 may be performed according to the methods described herein. In some examples, aspects of the operations of 1030 may be performed by a spatial parameter manager as described with reference to FIGS. 5 through 8.

Figure 11:
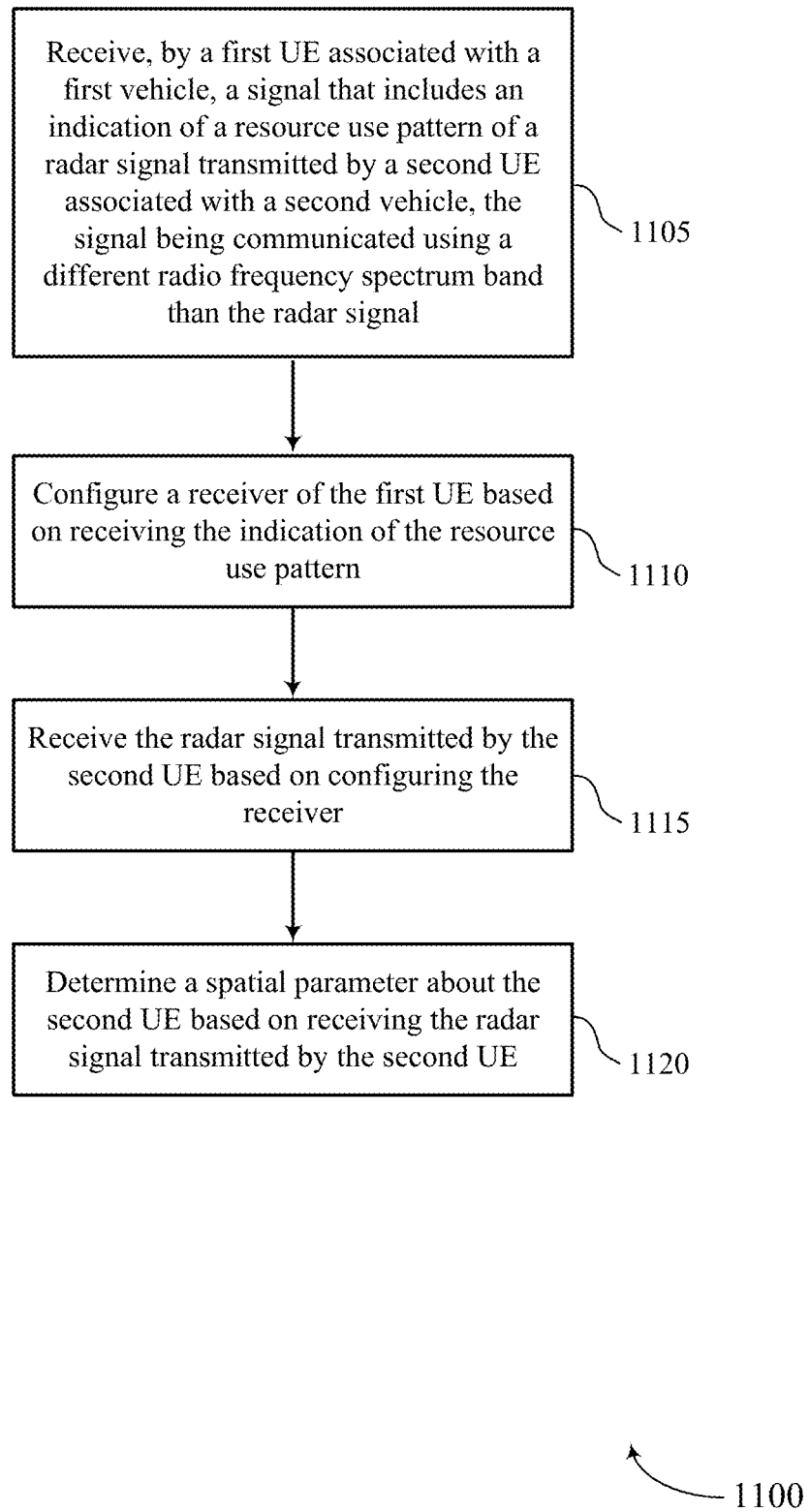

FIG. 11 shows a flowchart illustrating a method 1100 that supports signaling for radar systems in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may receive, by a first UE associated with a first vehicle, a signal that includes an indication of a resource use pattern of a radar signal transmitted by a second UE associated with a second vehicle, the signal being communicated using a different radio frequency spectrum band than the radar signal. The operations of 1105 may be performed according to the methods described herein. In some examples, aspects of the operations of 1105 may be performed by an indication manager as described with reference to FIGS. 5 through 8.

At 1110, the UE may configure a receiver of the first UE based on receiving the indication of the resource use pattern. The operations of 1110 may be performed according to the methods described herein. In some examples, aspects of the operations of 1110 may be performed by a radar manager as described with reference to FIGS. 5 through 8.

At 1115, the UE may receive the radar signal transmitted by the second UE based on configuring the receiver. The operations of 1115 may be performed according to the methods described herein. In some examples, aspects of the operations of 1115 may be performed by a radar manager as described with reference to FIGS. 5 through 8.

At 1120, the UE may determine a spatial parameter about the second UE based on receiving the radar signal transmitted by the second UE. The operations of 1120 may be performed according to the methods described herein. In some examples, aspects of the operations of 1120 may be performed by a spatial parameter manager as described with reference to FIGS. 5 through 8.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC- FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving, by a first user equipment (UE) associated with a first vehicle, an indication of a resource use pattern of a radar signal transmitted by a second UE associated with a second vehicle;
configuring a receiver of a radar system of the first UE based at least in part on receiving the indication of the resource use pattern;
receiving the radar signal transmitted by the second UE based at least in part on configuring the receiver, wherein the radar signal received from the second UE has been reflected off of an obstacle; and
determining a spatial parameter about the second UE based at least in part on a Doppler shift of the radar signal reflected off of the obstacle.

2. The method of claim 1, further comprising:
receiving, by the first UE, a second indication of a second resource use pattern of a second radar signal transmitted by a third UE associated with a third vehicle; and
configuring the receiver to filter out the second radar signal transmitted by the third UE based at least in part on receiving the radar signal transmitted by the second UE.

3. The method of claim 1, further comprising:
determining a second spatial parameter for the first UE; and
filtering the radar signal using the second spatial parameter, wherein determining the spatial parameter for the second UE is based at least in part on filtering the radar signal using the second spatial parameter.

4. The method of claim 1, further comprising:
receiving sync information; and
determining a transmit parameter of the radar signal based at least in part on receiving the sync information, wherein determining the spatial parameter about the second UE is based at least in part on determining the transmit parameter of the radar signal.

5. The method of claim 1, further comprising:
transmitting feedback to the second UE based at least in part on determining the spatial parameter of the second UE.

6. The method of claim 1, wherein receiving the indication comprises:
receiving a second radar signal that includes the indication, the second radar signal being encoded with information about the resource use pattern of the radar signal transmitted by the second UE.

7. The method of claim 6, wherein the second radar signal comprises radar timing information, the indication of the resource use pattern, and information associated with the resource use pattern.

8. The method of claim 1, wherein receiving the indication comprises:
receiving a signal that includes the indication, the signal being communicated using a different radio frequency spectrum band than the radar signal.

9. The method of claim 8, wherein the signal is modulated using a Wi-Fi radio access technology (RAT), a Bluetooth RAT, a 3G RAT, a 4G RAT, a 5G RAT, a Zigbee RAT, a dedicated short range communications (DSRC) RAT, a vehicle-to-everything (V2X) RAT, or a combination thereof.

10. The method of claim 1, further comprising:
identifying a location of the obstacle, wherein determining the spatial parameter about the second UE is based at least in part on identifying the location of the obstacle.

11. The method of claim 10, wherein identifying the location of the obstacle comprises:
accessing map data to determine the location of the obstacle relative to the first UE.

12. The method of claim 10, wherein identifying the location of the obstacle comprises:
transmitting, by the first UE, a second radar signal; and
receiving, by the first UE, a third radar signal reflected off of the obstacle based at least in part on transmitting the second radar signal, wherein identifying the location of the obstacle is based at least in part on receiving the third radar signal.

13. The method of claim 1, further comprising:
identifying the Doppler shift of the radar signal reflected off of the obstacle; and
filtering components of the Doppler shift of the radar signal contributed by movement of the first UE, wherein determining the spatial parameter about the second UE is based at least in part on filtering the components of the Doppler shift of the radar signal contributed by the movement of the first UE.

14. The method of claim 1, further comprising:
receiving a second radar signal transmitted by the second UE, the second radar signal being reflected off of the obstacle; and
determining a transmit parameter of the radar signal based at least in part on receiving the radar signal and the second radar signal transmitted by the second UE, wherein determining the spatial parameter about the second UE is based at least in part on determining the transmit parameter of the radar signal.

15. The method of claim 1, further comprising:
operating a vehicle associated with the first UE based at least in part on determining the spatial parameter of the second UE.

16. The method of claim 1, further comprising:
storing information related to a plurality of radar signals received from the second UE over time; and
filtering the stored information by rejecting outliers in the information, wherein determining the spatial parameter about the second UE is based at least in part on filtering the stored information.

17. The method of claim 1, further comprising:
determining a characteristic of the radar signal based at least in part on receiving the radar signal, wherein determining the spatial parameter is based at least in part on determining the characteristic.

18. The method of claim 17, wherein the characteristic comprises a time of flight of the radar signal, the Doppler shift of the radar signal, or an angle of arrival of the radar signal, or a combination thereof.

19. The method of claim 1, wherein the spatial parameter of the second UE comprises a location of the second UE, a speed of the second UE, a direction of travel of the second UE, a velocity of the second UE, or a combination thereof.

20. The method of claim 1, wherein the resource use pattern comprises information regarding frequency resources for use by the second UE to transmit the radar signal, time resources for use by the second UE to transmit the radar signal, a direction of transmission of the radar signal transmitted by the second UE, or a combination thereof.

21. The method of claim 1, wherein a resource use pattern for transmitting a radar signal is unique to each UE in a network.

22. An apparatus for wireless communication, comprising:
a processor; and
memory in electronic communication with the processor, the memory and the processor configured to cause the apparatus to:
receive, by a first user equipment (UE) associated with a first vehicle, an indication of a resource use pattern of a radar signal transmitted by a second UE associated with a second vehicle;
configure a receiver of a radar system of the first UE based at least in part on receiving the indication of the resource use pattern;
receive the radar signal transmitted by the second UE based at least in part on configuring the receiver, wherein the radar signal received from the second UE has been reflected off of an obstacle; and
determine a spatial parameter about the second UE based at least in part on a Doppler shift of the radar signal reflected off of the obstacle.

23. The apparatus of claim 22, wherein the processor and the memory are further configured to cause the apparatus to:
receive, by the first UE, a second indication of a second resource use pattern of a second radar signal transmitted by a third UE associated with a third vehicle; and
configure the receiver to filter out the second radar signal transmitted by the third UE based at least in part on receiving the radar signal transmitted by the second UE.

24. The apparatus of claim 22, wherein the processor and the memory are further configured to cause the apparatus to:
determine a second spatial parameter for the first UE; and
filter the radar signal using the second spatial parameter, wherein determining the spatial parameter for the second UE is based at least in part on filtering the radar signal using the second spatial parameter.

25. The apparatus of claim 22, wherein the processor and the memory are further configured to cause the apparatus to:
receive sync information; and
determine a transmit parameter of the radar signal based at least in part on receiving the sync information, wherein determining the spatial parameter about the second UE is based at least in part on determining the transmit parameter of the radar signal.

26. The apparatus of claim 22, wherein the processor and the memory are further configured to cause the apparatus to:
transmit feedback to the second UE based at least in part on determining the spatial parameter of the second UE.

27. An apparatus for wireless communication, comprising:
means for receiving, by a first user equipment (UE) associated with a first vehicle, an indication of a resource use pattern of a radar signal transmitted by a second UE associated with a second vehicle;
means for configuring a receiver of a radar system of the first UE based at least in part on receiving the indication of the resource use pattern;
means for receiving the radar signal transmitted by the second UE based at least in part on configuring the receiver, wherein the radar signal received from the second UE has been reflected off of an obstacle; and
means for determining a spatial parameter about the second UE based at least in part on a Doppler shift of the radar signal reflected off of the obstacle.

28. A non-transitory computer-readable medium storing code for wireless communication, the code comprising instructions executable by a processor to:
receive, by a first user equipment (UE) associated with a first vehicle, an indication of a resource use pattern of a radar signal transmitted by a second UE associated with a second vehicle;
configure a receiver of a radar system of the first UE based at least in part on receiving the indication of the resource use pattern;
receive the radar signal transmitted by the second UE based at least in part on configuring the receiver, wherein the radar signal received from the second UE has been reflected off of an obstacle; and
determine a spatial parameter about the second UE based at least in part on a Doppler shift of the radar signal reflected off of the obstacle.

* * * * *